Patented Oct. 24, 1939

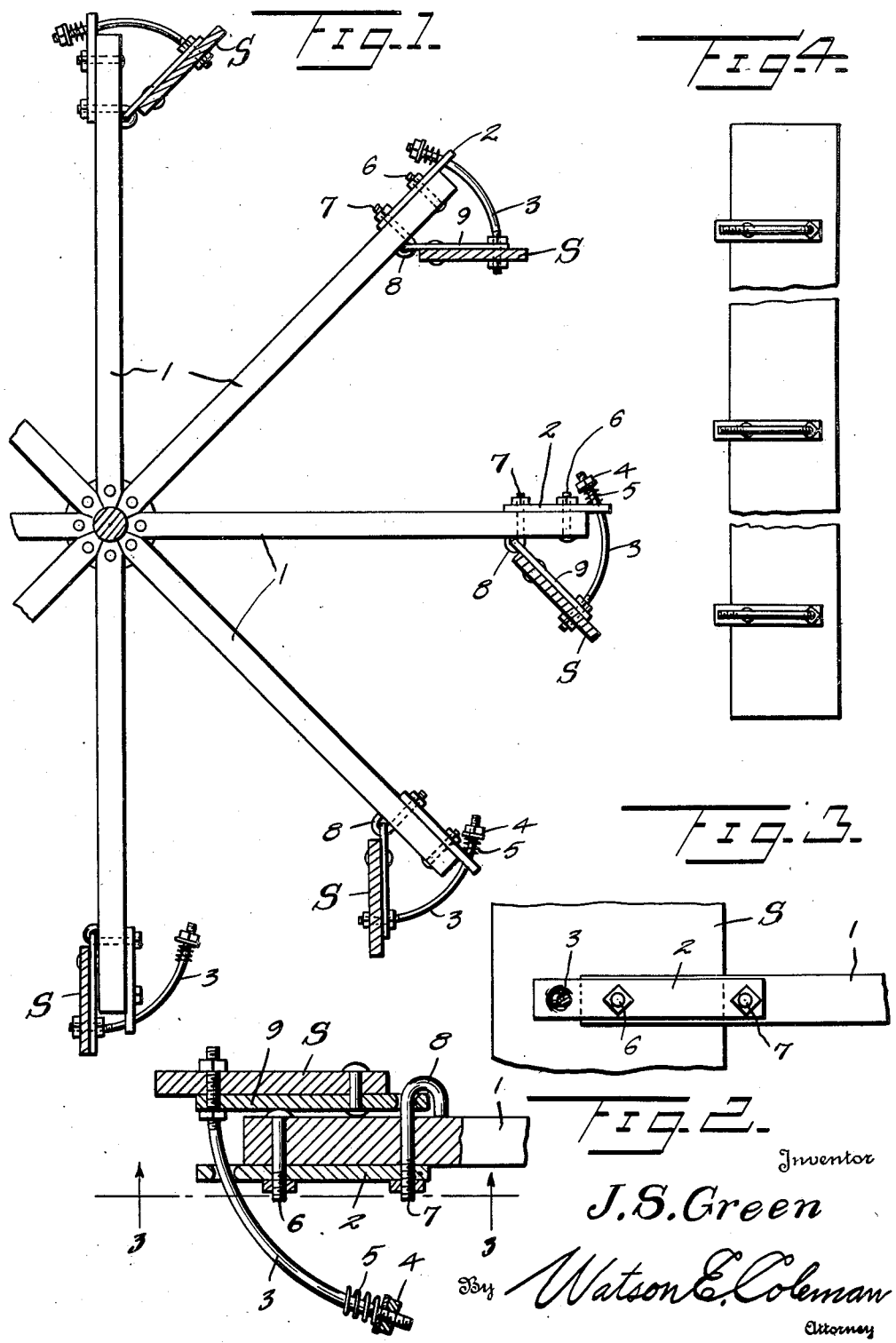

2,177,317

UNITED STATES PATENT OFFICE 2,177,317

REEL FOR GATHERING STANDING GRAIN

John S. Green, Terra Bella, Calif.

Application January 3, 1939, Serial No. 249,069

1 Claim. (Cl. 56—226)

This invention relates to a reel for gathering standing grain, and it is an object of the invention to provide a reel wherein the slats are attached or mounted in a manner whereby the slats under their own weight will drop down with respect to the spokes of the reel as the blades descend to assume a position to hit the heads of the standing grain from the back to assure proper forcing of the heads into the cutting mechanism and wherein said slats in passing directly over the cutting mechanism are substantially vertical.

The invention consists in the details of construction and in the combination and arrangement of the several parts of my improved reel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a fragmentary view partly in end elevation and partly in section of a reel constructed in accordance with an embodiment of my invention;

Figure 2 is an enlarged detailed sectional view with portions in elevation illustrating one of the connections between a slat and spoke;

Figure 3 is a sectional view taken substantially on the line 3—3 of Figure 2 looking in the direction of the arrow;

Figure 4 is a fragmentary rear elevational view of a slat unapplied.

As disclosed in the accompanying drawing, 1 denotes the spokes comprised in a reel structure and secured to the rear face of each of said spokes at the outer extremity thereof is a bar 2 which extends a distance beyond the adjacent end of the spoke. This extended portion of the bar is provided with an opening through which freely passes an end portion of an arcuate rod 3 secured to a slat S of the reel adjacent to the outer longitudinal marginal portion thereof and extending from the rear face of the slat S. This arcuate rod 3 is of desired length and the end portion thereof rearwardly of the extended part of the bar 2 is provided with a head or enlargement 4 such as a nut threading thereon. Interposed between this head or enlargement 4 and the extended portion of the bar 2 is a shock absorbing element 5 herein disclosed as a coil spring surrounding the portion of the rod 3 rearwardly of the extended part of the bar 2.

The bar 2 is held to its spoke 1 by the spaced bolts 6 and 7. The inner bolt 7 is provided with a hook head 8 which is freely directed through an extended portion of a plate 9 carried by the inner marginal portion of the slat S. By this means the slat S is hingedly secured to the spoke 1 and in a manner whereby the slat is free to swing with respect to the spoke 1 within a range from a point in contact with the spoke 1 to the limit of movement away from the spoke 1 permitted by the rod 3 and the head or enlargement 4 thereof.

When the reel is in rotation and as a slat descends it will drop by gravity to the limit of its swinging movement away from its associated spokes and when in such position the blade will effectively hit the heads of the standing grain from the back whereby the heads will be forced into the cutting bar and the draper as comprised in the conventional type of harvesting machines.

The slat S drops down by its own weight but will assume a position immediately adjacent to its spokes 1 when the slat approaches its lowermost position and will maintain such position until it again passes up and beyond its vertical center of rotation.

The full weight of the falling slat S is caught on the steel bars 2 carried by the spokes 1 so that the hinged connections between the slat S and the spokes 1 will not receive the blow of the falling reel nor will the weight of the slat rest upon such hinged connections.

The shock of the blow of the falling slat S is broken by the cushioning element or spring 5. While this element is illustrated as a coil spring I do not wish to be understood as limiting myself to this exact particular.

With the use of the ordinary stationary slat such slat strikes many heads of standing grain on top causing the brittle stalks to snap and the heads of grain to fall to the ground or spring out and away from the header. With the slat mounted and arranged as herein disclosed these disadvantages are avoided.

From the foregoing description it is thought to be obvious that a reel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A reel for harvesting machines comprising slats, spokes associated with each of the slats, means for hingedly connecting the lower marginal portions of the slats with their associated spokes at a point inwardly of the outer ends of said spokes, members carried by the spokes and extending beyond the outer ends thereof, curved rods secured to the slats and freely extending through the members of the spokes, cushioning means carried by the rods for coaction with the rear faces of the members to limit the swinging movement of the slats away from the spokes and to absorb shock, the slats swinging downwardly by gravity, the cushioning means carried by the rods offering no resistance to said gravity movement until the slats have substantially reached their limit of gravity movement.

JOHN S. GREEN.